(12) United States Patent
Houser et al.

(10) Patent No.: US 11,047,470 B2
(45) Date of Patent: Jun. 29, 2021

(54) AXLE ASSEMBLY WITH LUBRICATION PUMP

(71) Applicant: Dana Heavy Vehicle Systems Group, LLC, Maumee, OH (US)

(72) Inventors: Jordan M. Houser, Toledo, OH (US); Mark W. Leber, Holland, OH (US); Marcus W. Schmidt, Swanton, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/795,846

(22) Filed: Feb. 20, 2020

(65) Prior Publication Data
US 2020/0309249 A1 Oct. 1, 2020

Related U.S. Application Data

(60) Provisional application No. 62/823,688, filed on Mar. 26, 2019.

(51) Int. Cl.
*F16H 57/04* (2010.01)

(52) U.S. Cl.
CPC ....... *F16H 57/0483* (2013.01); *F16H 57/045* (2013.01); *F16H 57/0435* (2013.01); *F16H 57/0436* (2013.01)

(58) Field of Classification Search
None
See application file for complete search history.

(56) References Cited

U.S. PATENT DOCUMENTS

| | | | |
|---|---|---|---|
| 3,618,712 A | 11/1971 | Casey | |
| 5,092,746 A | 3/1992 | Henke | |
| 5,513,962 A | 5/1996 | Easton | |
| 5,643,127 A * | 7/1997 | Yoshii | F16H 57/043 |
| | | | 475/160 |
| 5,662,188 A * | 9/1997 | Ito | B62D 5/07 |
| | | | 184/11.1 |
| 8,152,674 B2 * | 4/2012 | Hayes | F16H 57/0483 |
| | | | 475/160 |
| 8,459,134 B2 * | 6/2013 | Harashima | F04C 14/04 |
| | | | 74/325 |

(Continued)

FOREIGN PATENT DOCUMENTS

WO 2018069163 4/2018

*Primary Examiner* — Dirk Wright
(74) *Attorney, Agent, or Firm* — Marshall & Melhorn LLC (57) ABSTRACT

An axle assembly including a lubrication pump operably configured to distribute lubricating fluid within the axle assembly. The lubrication pump includes a fluid inlet port, a fluid outlet port, an air inlet port, and an air outlet valve; a pump housing interposed between the first end and the second end; a piston reservoir disposed in the pump housing, wherein the piston reservoir has a first side and a second side, wherein the second side is in fluid communication with the air inlet port; a piston disposed in the piston reservoir between the first side and the second side; a first check valve housed within the inlet port; a second check valve housed within the outlet port; and one or more biasing members interposed between the piston and the fluid inlet port and the fluid outlet port in the first side of the piston reservoir.

11 Claims, 6 Drawing Sheets

(56) References Cited

U.S. PATENT DOCUMENTS

| | | | |
|---|---|---|---|
| 8,727,928 B2 * | 5/2014 | Harashima | F16H 57/0483 |
| | | | 475/221 |
| 8,858,381 B2 | 10/2014 | Trost | |
| 9,028,358 B2 | 5/2015 | Valente | |
| 9,103,433 B2 | 8/2015 | Kwasniewski | |
| 9,126,576 B2 | 9/2015 | Rühle | |
| 9,267,596 B2 | 2/2016 | Trost | |
| 9,810,311 B1 | 11/2017 | Zhang | |
| 2011/0297258 A1 * | 12/2011 | Tanaka | F16H 61/0025 |
| | | | 137/565.11 |
| 2013/0145879 A1 * | 6/2013 | Nakamura | F16H 57/043 |
| | | | 74/467 |
| 2016/0341192 A1 | 11/2016 | Jansson | |
| 2016/0369786 A1 | 12/2016 | Vehmaa | |

* cited by examiner

FIG. 6

AXLE ASSEMBLY WITH LUBRICATION PUMP

CROSS REFERENCE TO RELATED APPLICATIONS

The present application claims the benefit to U.S. Provisional Patent Application No. 62/823,688, filed on Mar. 26, 2019, which is incorporated herein by reference in its entirety.

FIELD

The present disclosure relates to an axle assembly with a lubrication pump and a method of distributing lubricating fluid.

BACKGROUND

Axle assemblies have internal cavities housing gear assemblies that must be properly lubricated to avoid premature wear and failure. The internal cavities must be filled with a certain level of lubricating fluid so that the bearings and gear assemblies can be lubricated as bearings and gear components rotate within the internal cavity. However, conventional axle assemblies often suffer from efficiency losses at the gear assembly that result from churning of the lubricating fluid. Excessive churning of the lubricating fluid can lead to inadequate lubrication coverage for bearings and gear components, resulting in premature wear.

A lack of sufficient lubrication on bearings, gear components, and other desired components is particularly problematic during vehicle startup. Lubricating fluid is not immediately available to those desired components when the vehicle is getting to a desired speed and when the oil system is being primed. As a result, components of the axle assembly experience increased wear. It would therefore be advantageous to more qufickly and efficiently provide lubricating fluid to desired components of an axle assembly, such as gears and bearings, during vehicle startup.

SUMMARY

In an embodiment, an axle assembly disclosed herein includes a pair of axle half shafts and an axle housing having a center portion defining a sump portion. The axle assembly also includes a lubrication pump positioned within the axle housing, wherein the lubrication pump includes a cylindrical portion, wherein the cylindrical portion includes a first end comprising a fluid inlet port and an opposing fluid outlet port, wherein a first valve is at least partially disposed within the fluid inlet port and wherein a second valve is at least partially disposed within the fluid outlet port; a second end comprising an air inlet port, wherein a third valve is at least partially disposed within the air inlet port; and a pump housing interposed between the first end and the second end, wherein the pump housing includes a piston reservoir, wherein the piston reservoir has a first side and a second side, wherein the second side is in selective, fluid communication with the air inlet port; a piston at least partially disposed in the piston reservoir, wherein the piston is positioned between the first side and the second side of the piston reservoir; and one or more pump fill members interposed between the piston and each of the fluid inlet port and the fluid outlet port in the first side of the piston reservoir, wherein the one or more pump fill members are configured to move the piston.

In some embodiments, each of the first and second valves are one-way check valves.

In some embodiments, the third valve is an air outlet valve and the air outlet valve is disposed within a fitting in the air inlet port.

In some embodiments, the one or more pump fill members are one or more compression springs, one or more wave springs, one or more tension springs, one or more vacuums, one or more pistons, one or more motors, or any combinations thereof.

In an embodiment, a method for distributing an amount of lubricating fluid in an axle assembly includes providing an axle housing having a center portion defining a sump portion; providing a lubrication pump positioned within the axle housing, wherein the lubrication pump includes a fluid inlet port and an opposing fluid outlet port, wherein a first valve is at least partially disposed within the fluid inlet port and wherein a second valve is at least partially disposed within the fluid outlet port; an air inlet port, wherein an air outlet valve is at least partially disposed within the air inlet port; a piston reservoir having a first side and a second side, wherein the second side is in selective, fluid communication with the air inlet port; a piston at least partially disposed in the piston reservoir; and one or more pump fill members interposed between the piston and each of the fluid inlet port and the fluid outlet port. The method also includes moving the amount of lubricating fluid from the sump portion through the first valve and into the piston reservoir via the fluid inlet port; filling the second side of the piston reservoir with air to move the piston from a first position to a second position; guiding the amount of lubricating fluid through the second valve and the fluid outlet port; and releasing air, via the air outlet valve, from the lubrication pump to move the piston back to the first position.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the present disclosure may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Disclosed herein is an axle assembly with a lubrication pump. It is within the scope of this disclosure that the axle assembly with a lubrication pump can be used in a tandem axle assembly, a tridem axle assembly, a single axle assembly, and/or an electric axle assembly.

Additionally, it is within the scope of this disclosure, and as a non-limiting example, that the lubrication pump assembly disclosed herein may be used in automotive, off-road vehicle, all-terrain vehicle, construction, and structural applications. As a non-limiting example, the lubrication pump assembly disclosed herein may also be used in passenger vehicle, electric vehicle, hybrid vehicle, commercial vehicle, autonomous vehicles, semi-autonomous vehicles and/or heavy vehicle applications.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

Figure 1:
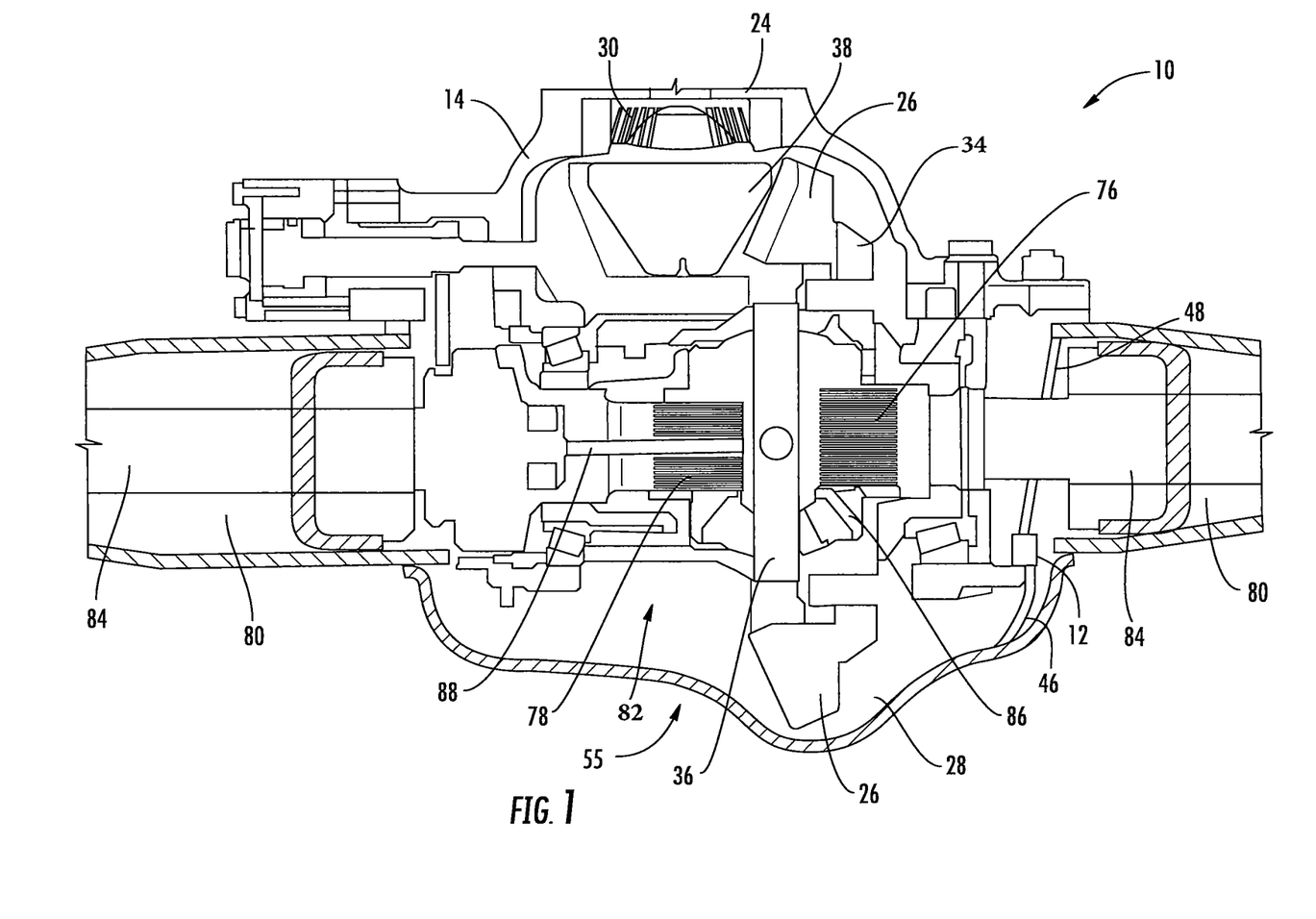
FIG. 1 is a schematic sectional view of an axle assembly having a lubrication pump according to an embodiment of the disclosure.

FIG. 1 shows a schematic sectional view of an axle assembly 10 according to an embodiment of the disclosure. The axle assembly 10 shown in FIG. 1 includes an axle housing 14, a pair of axle half shaft housings 80, and an axle differential assembly 82. The axle housing 14 may have a size and a shape to receive and/or retain at least a portion of the axle differential assembly 82 therein. Even though a forward axle assembly 10 is illustrated in the embodiment illustrated in FIG. 1, any axle assembly can be used in other embodiments of the disclosure.

The axle housing 14 may include a center portion 55 disposed proximate the center of the axle housing 14. The center portion 55 may define a cavity that may receive the axle differential assembly 82.

As best seen in FIG. 1 and as a non-limiting example, at least a portion of each of the axle half shaft housings 80 may be integrally connected to opposing ends of the axle housing 14. The pair of axle half shaft housings 80 may be of a size and shape to receive at least a portion of a pair of axle half shafts 84.

The axle differential assembly 82 includes one or more pinion gears 38 coupled to one more pinion gear shafts 24 extending into at least a portion of the axle housing 14. The pinion gear shafts 24 transmit an amount of rotational energy from a prime mover to the axle differential assembly 82. The pinion gear shafts 24 may be supported by one or more bearings 30 for rotation.

Integrally connected to at least a portion of an axle differential case 34 of the axle differential assembly 20 are one or more ring gears 26. The one or more ring gears 26 include a plurality of teeth that may meshingly engage with one or more teeth on the pinion gears 38. It is within the scope of this disclosure and as a non-limiting example that the ring gears 26 may be configured to splash an amount of lubrication fluid onto the various components of the axle differential assembly 82, such as the bearings 30, which may require lubrication and/or cooling when in operation. As a non-limiting example, the lubrication fluid may be an oil composition.

A spider shaft 36 extends through the interior of the axle differential case 34. As best shown in FIG. 1 and as a non-limiting example, the spider shaft 36 may be interposed between a first side gear 76 and a second side gear 78. The first side gear 76 is meshingly engaged with one or more spider gears 86. The first side gear 76 may be connected to one of the pair of axle half shafts 84 and the second side gear 78 may be splined to a stub shaft 88.

As best shown in FIG. 1, a lower region of the center portion 55 may at least partially define a sump portion 28 that is located beneath the axle differential assembly 82. The sump portion 28 is configured to hold an amount of lubrication fluid through which the one or more ring gears 26 may rotate to lubricate and cool various components on the axle assembly 10, such as the axle differential assembly 82. Splashed lubrication fluid may flow down the sides of the center portion 55 and may flow over internal components of the axle assembly 10 and gather in the sump portion 28.

As shown in FIG. 1, the axle assembly 10 further comprises a lubrication pump 12 positioned within the axle housing 14. In some embodiments, the lubrication pump 12 may extend through the axle housing 14 or be external to the axle housing 14.

The lubrication pump 12 may be configured to pump or distribute lubricating fluid within the axle housing 14. The lubrication pump 12 may be used to pump lubrication fluid from the sump portion 28 to the rotating/moving parts of the axle assembly 10 when the axle assembly 10 is rotatingly disengaged or when there is an insufficient amount of splashed lubrication fluid.

As seen in FIG. 1, a fluid inlet passage 46 may receive lubricating fluid from the sump portion 28 or other portions of the axle assembly 10 and a fluid outlet passage 48 may direct lubricating fluid to one or more desired locations in the axle assembly 10. A first portion of the lubrication pump 12 is connected to the fluid inlet passage 46 and a second portions of the lubrication pump 12 is connected to the fluid outlet passage 48.

The lubrication pump 12 may be any type of lubrication pump. In some embodiments, the lubrication pump 70 may be a gerotor pump, a gear pump, a crescent pump, a vane pump, or the like.

In a non-limiting example, the lubrication pump 12 is pneumatically operated, without being electrically powered or mechanically driven by the axle assembly 10, which includes not having any rotation of the input shaft 16 or the output shaft 22. As such, the lubrication pump 12 may be operated anytime that the lubrication pump 12 receives air pressure, such as during vehicle startup events (e.g. service brake released in vehicle) when lubricating fluid is not immediately available in moving components within the axle housing 14, In such conditions, lubricating fluid may be pumped to the desired components within the axle housing 14 without the use of a full time pump or without vehicle motion.

Figure 2:
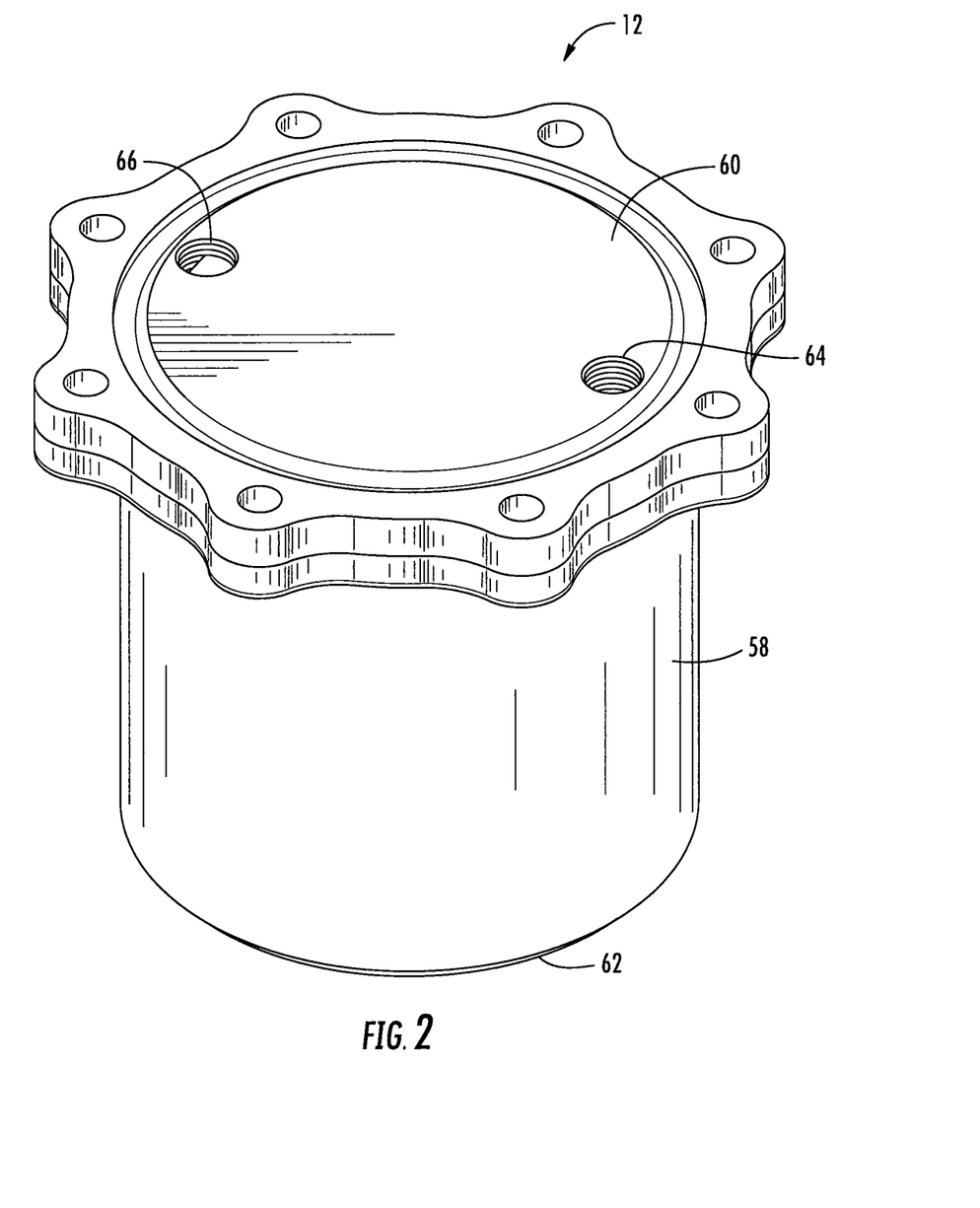
FIG. 2 is a schematic perspective view of the lubrication pump illustrated in FIG. 1.

FIG. 2 shows a schematic perspective view of the lubrication pump 12 illustrated in FIG. 1. The lubrication pump 12 comprises a fluid inlet port 64 in selective, fluid communication with the fluid inlet passage 46. The lubrication pump 12 also comprises an opposing fluid outlet port 66 in selective, fluid communication with the fluid outlet passage 48. Each of the fluid inlet passage 46 and the fluid outlet passage 48 may be configured as a hose, a tube, a channel, an opening, or a passage.

Figure 3:
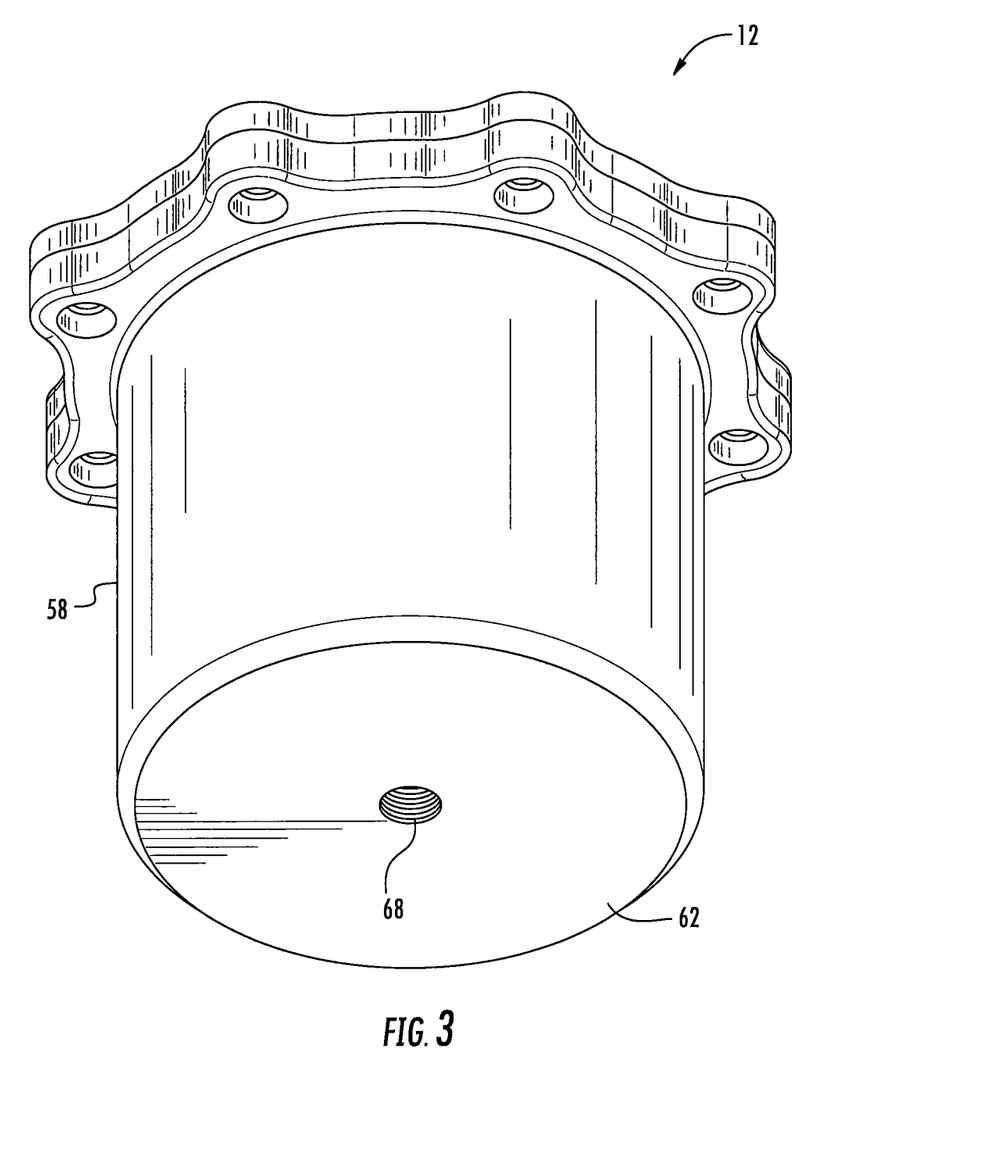
FIG. 3 is another schematic perspective view of the lubrication pump illustrated in FIGS. 1 and 2.

As seen in FIGS. 2 and 3, the lubrication pump 12 also includes a cylindrical portion 58 having a first end 60 and a second end 62. As best shown in FIG. 2, fluid inlet port 64 and the fluid outlet port 66 are both disposed on the first end 60 of the cylindrical portion 58.

As best shown in FIG. 3, the lubrication pump 12 includes an air inlet port 68 disposed on the second end 62. The air inlet port 68 is configured to draw air into the lubrication pump 12 from a vehicle's onboard air routing system.

Figure 4:
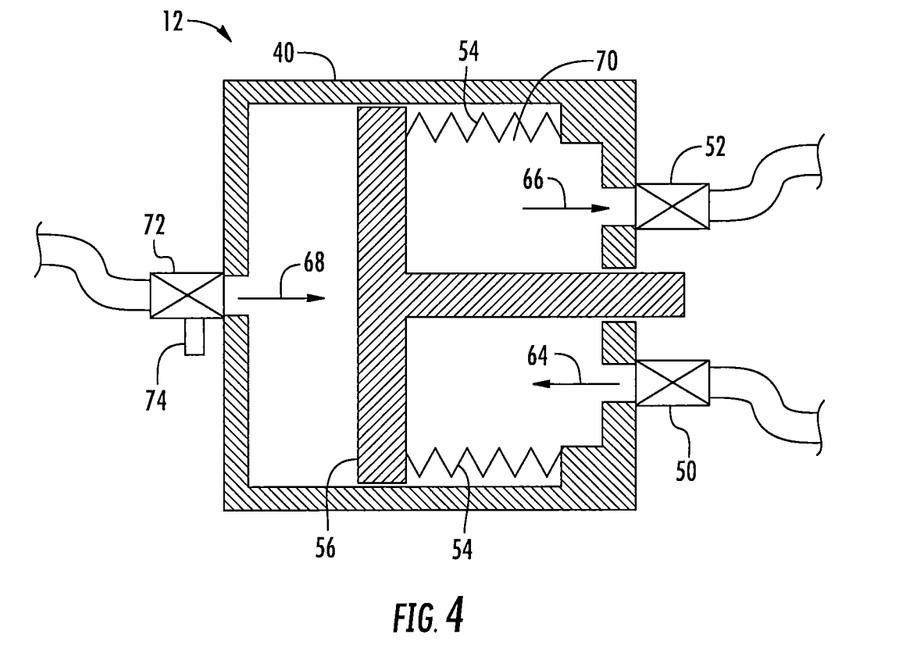
FIG. 4 is a schematic sectional view of an interior portion of the lubrication pump illustrated in FIGS. 1-3.

FIG. 4 shows a schematic sectional view of the interior of the cylindrical portion 58 of the lubrication pump 12. The cylindrical portion 58 includes a pump housing 40 for receiving and retaining various components of the cylindrical portion 58. A piston reservoir 70 is disposed within the pump housing 40. The piston reservoir 70 is configured to receive and/or retain lubricating fluid from the sump portion 28 and/or from other components of the axle assembly 10. As best shown in FIG. 4 and as a non-limiting example, the piston reservoir 70 may be substantially cylindrical in shape.

A first valve 50 is disposed in the fluid inlet port 64, The first valve 50 may be a variety of different valves, such as a check valve. The first valve 50 is configured to ensure that lubricating fluid only flows one way through the fluid inlet port 64 and into the piston reservoir 70. The first valve 50 may be threaded into the fluid inlet port 64, wherein the first valve 50 may be partially disposed in the interior of the cylindrical portion 58 and/or the exterior of the cylindrical portion 58. In another embodiment, the first valve 50 may be disposed on the fluid inlet passage 46. In yet another embodiment, the first valve 50 may be partially disposed on the fluid inlet passage 46 and partially disposed in the fluid inlet port 64.

As best shown in FIG. 4 and as a non-limiting example, a second valve 52 is disposed in the fluid outlet port 66. The second valve 52 may be a variety of different valves, such as a check valve. The second valve 52 is configured to direct lubricating fluid to flow only one way through the fluid outlet port 66 and to one or more desired locations in the axle assembly 10, The second valve 52 may be threaded into the fluid outlet port 66, wherein the second valve 50 may be partially disposed in the interior of the cylindrical portion 58 and/or the exterior of the cylindrical portion 58. In another embodiment, the second valve 52 may be disposed on the fluid outlet passage 48. In yet another embodiment, the second valve 52 may be partially disposed on the fluid outlet passage 48 and partially disposed in the fluid outlet port 66.

As best shown in FIG. 4, an air outlet/bleeder valve 74 is positioned on the second end 62 of the lubrication pump 12. One of ordinary skill in the art would appreciate that the air outlet/bleeder valve 74 may be any type of valve. The air outlet/bleeder valve 74 is configured to selectively release air from the second end 62 of the lubrication pump 12. The air outlet/bleeder valve 74 may release air from the lubrication pump 12 after the lubrication pump 12 has been activated so that the piston 56 may return to its position and draw more lubricating fluid into the pump housing 40, or other areas along the vehicle's onboard air routing system.

As best shown in FIG. 4 and as a non-limiting example, the air outlet/bleeder valve 74 is disposed within a fitting 72 in the air inlet port 68. In an alternative embodiment, the air outlet/bleeder valve 74 may be positioned on a separate port from the air inlet port 68 on the second end of the lubrication pump 12.

Figure 5:
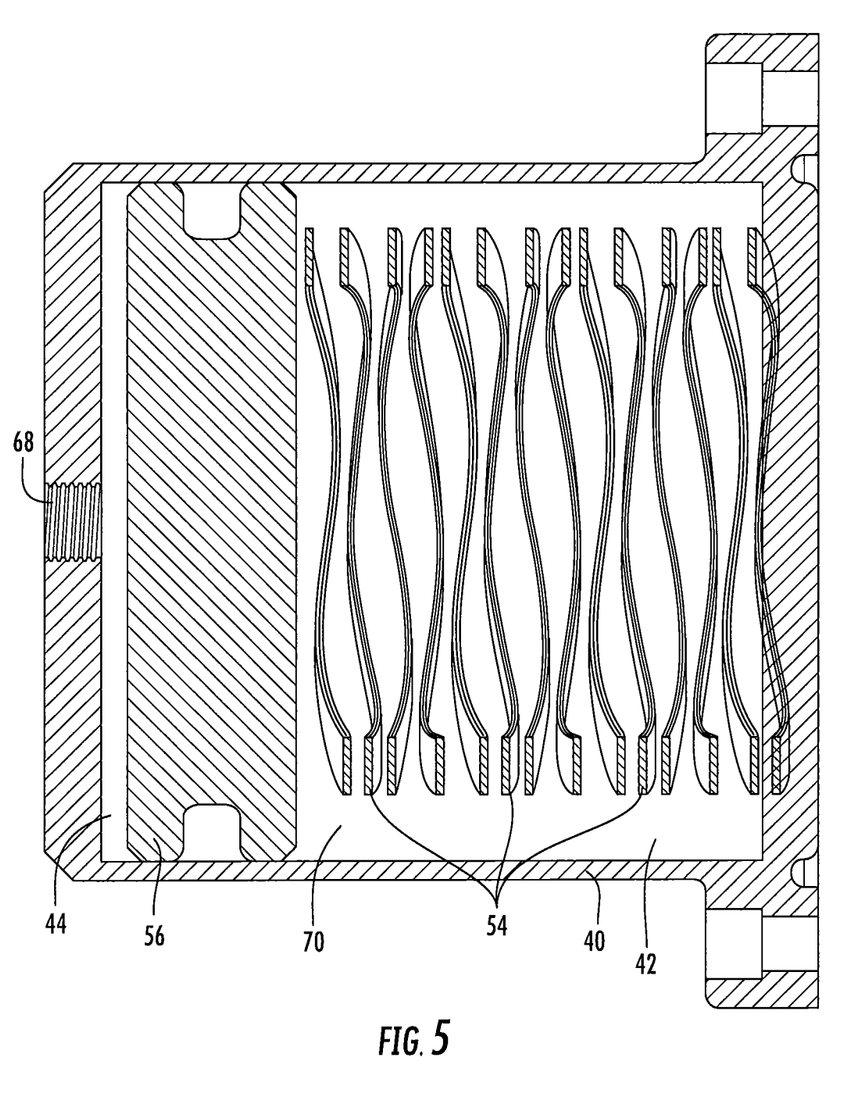
FIG. 5 is another schematic sectional view of an interior portion of the lubrication pump illustrated in FIGS. 1-4.

As seen in FIGS. 4 and 5, a piston 56 is at least partially disposed within the piston reservoir 70. The piston 56 is configured to move between an extended position and a retracted position. As best shown in FIG. 5, the piston 56 is interposed between a first side 42 and a second side 44 on the piston reservoir 70. The first side 42 may be either wet or dry and the second side 44 may be either wet or dry. The second side 44 is in selective fluid communication with the air inlet port 68.

In some embodiments, one or more gaskets, such as O-rings may be positioned within one or more grooves on the piston 56. The one or more O-rings serve to create a seal at the interface of the grooves on the piston 56.

As best shown in FIG. 5, one or more pump fill members 54 are disposed between the piston 56 and each of the fluid inlet port 64 and the fluid outlet port 66 on the first side 42. The one or more pump fill members 54 are configured to move the piston 56 as needed to lubricate various components in the axle assembly 10.

As a non-limiting example, the one or more pump fill members 54 are one or more biasing members, such as compression springs, wave springs, and/or tensions springs. In an alternative embodiment, the one or more pump fill members 54 are one or more vacuums that may be positioned on the second side 44 of the piston 56. In another alternative embodiment, the one or more pump fill mechanisms 54 are one or more secondary pistons positioned on the first side 42 of the piston 56. In yet another alternative embodiment, the one or more pump fill mechanisms 54 are one or more motors that drive the piston 56 in and out with a thread.

Figure 6:
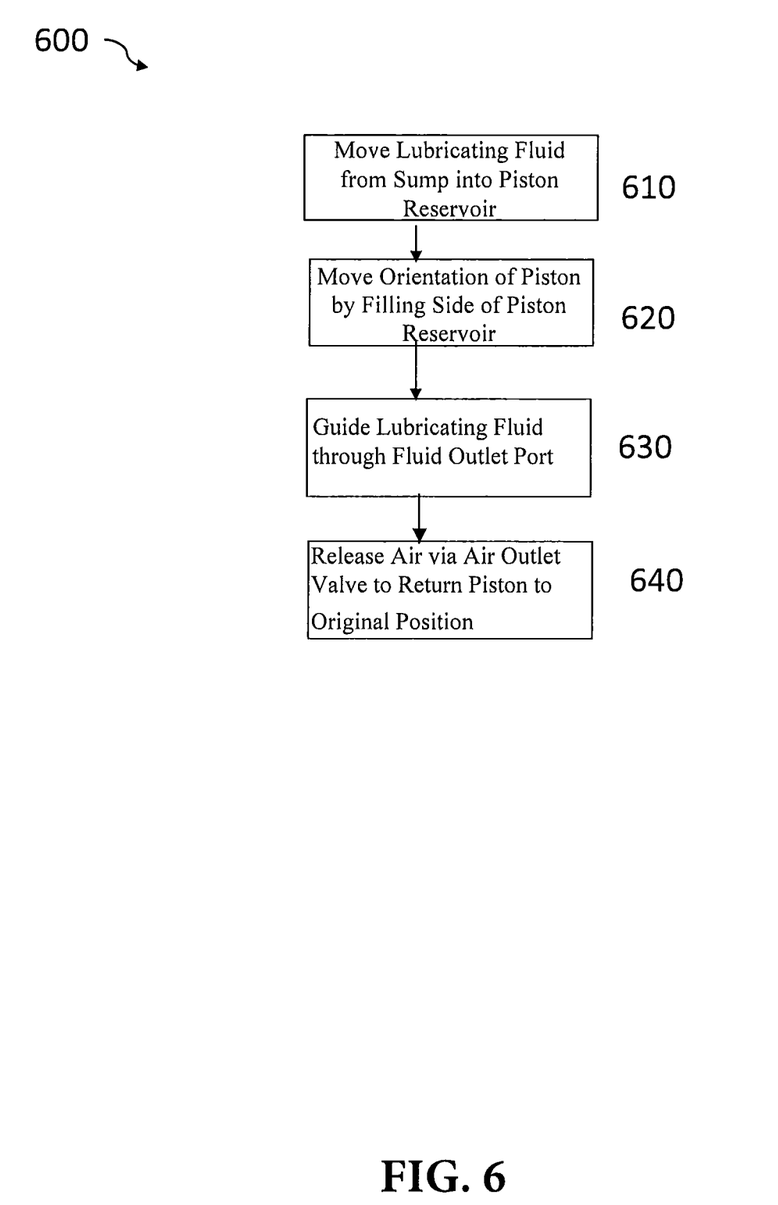
FIG. 6 illustrates a flow chart depicting an exemplary method for distributing lubricating fluid in the axle assembly illustrated in FIG. 1.

FIG. 6 shows an exemplary method 600 for distributing lubricating fluid in the axle assembly illustrated in FIG. 1. At block 610, lubricating fluid is transported from the sump portion 28 through the first valve 50 and into the piston reservoir 70 via the fluid inlet port 64.

Next, as shown in block 620, the second side 44 of the piston reservoir 70 is filled with air through the air inlet port 68. This causes the one or more pump fill members 54 to move the piston 56 from a first position to a second position. Lubricating fluid is then guided through the second valve 52 and the fluid outlet port 66 so that the lubricating fluid may be directed to the desired components on the axle assembly 10, as shown in block 630. This event may occur at any desired time during vehicle operation since the lubrication pump 12 may be pneumatically operated.

The piston 56 may then be moved back to the first position in the piston reservoir 70 via the one or more pump fill members 54, as shown in block 640. This occurs when air is released from the lubrication pump 12 via the air outlet/bleeder valve 74. As a result, the first side 42 may be charged again by filling the first side 42 with lubricating fluid that enters the lubrication pump 12 through the first valve 50. Since lubricating fluid may be provided at any time through the lubrication pump 12, there is no need for a full-time pump or for a vehicle to be in motion.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:
1. An axle assembly comprising:
   a pair of axle half shafts;
   an axle housing having a center portion defining a sump portion;

a lubrication pump positioned within the axle housing, wherein the lubrication pump includes a cylindrical portion, wherein the cylindrical portion comprises:
  a first end comprising a fluid inlet port and an opposing fluid outlet port, wherein a first valve is at least partially disposed within the fluid inlet port and wherein a second valve is at least partially disposed within the fluid outlet port;
  a second end comprising an air inlet port, wherein a third valve is at least partially disposed within the air inlet port; and
  a pump housing interposed between the first end and the second end, wherein the pump housing comprises:
    a piston reservoir, wherein the piston reservoir has a first side and a second side, wherein the second side is in selective, fluid communication with the air inlet port;
    a piston at least partially disposed in the piston reservoir, wherein the piston is positioned between the first side and the second side of the piston reservoir; and
    one or more pump fill members interposed between the piston and each of the fluid inlet port and the fluid outlet port in the first side of the piston reservoir, wherein the one or more pump fill members are configured to move the piston.

2. The axle assembly of claim 1, wherein each of the first and second valves are one-way check valves.

3. The axle assembly of claim 1, wherein the third valve is an air outlet valve.

4. The axle assembly of claim 3, wherein the air outlet valve is disposed within a fitting in the air inlet port.

5. The axle assembly of claim 1, wherein the one or more pump fill members comprise one or more compression springs, one or more wave springs, one or more tension springs, one or more vacuums, one or more pistons, one or more motors, or any combinations thereof.

6. The axle assembly of claim 1, wherein the piston comprises one or more grooves, and wherein one or more O-rings are positioned within the one or more grooves.

7. The axle assembly of claim 1, wherein the lubrication pump is pneumatically operated.

8. A method for distributing an amount of lubricating fluid in an axle assembly, the method comprising:
  providing an axle housing having a center portion defining a sump portion;
  providing a lubrication pump positioned within the axle housing, wherein the lubrication pump comprises:
    a fluid inlet port and an opposing fluid outlet port, wherein a first valve is at least partially disposed within the fluid inlet port and wherein a second valve is at least partially disposed within the fluid outlet port;
    an air inlet port, wherein an air outlet valve is at least partially disposed within the air inlet port;
    a piston reservoir having a first side and a second side, wherein the second side is in selective, fluid communication with the air inlet port;
    a piston at least partially disposed in the piston reservoir; and
    one or more pump fill members interposed between the piston and each of the fluid inlet port and the fluid outlet port;
  moving the amount of lubricating fluid from the sump portion through the first valve and into the piston reservoir via the fluid inlet port;
  filling the second side of the piston reservoir with air to move the piston from a first position to a second position;
  guiding the amount of lubricating fluid through the second valve and the fluid outlet port; and
  releasing air, via the air outlet valve, from the lubrication pump to move the piston back to the first position.

9. The method of claim 8, wherein the piston is moved back to the first position via the one or more pump fill members.

10. The method of claim 8, wherein each of the first and second valves are one-way check valves.

11. The method of claim 8, wherein the one or more pump fill members comprise one or more compression springs, one or more wave springs, one or more tension springs, one or more vacuums, one or more pistons, one or more motors, or any combinations thereof.

* * * * *